April 5, 1960   R. G. GLENN   2,931,169
VARIABLE CONVERGENT-DIVERGENT EXHAUST NOZZLE
Filed May 15, 1956   3 Sheets-Sheet 1
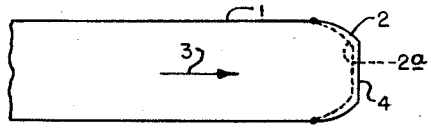
FIG.1.
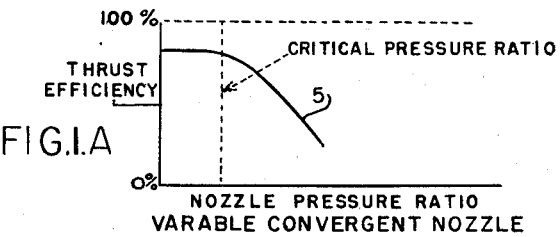
FIG.1.A.
NOZZLE PRESSURE RATIO
VARABLE CONVERGENT NOZZLE
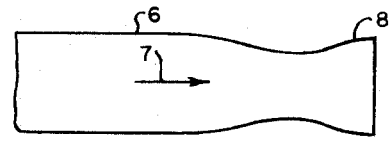
FIG.2.
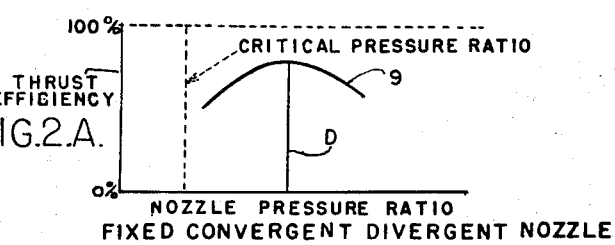
FIG.2.A.
NOZZLE PRESSURE RATIO
FIXED CONVERGENT DIVERGENT NOZZLE
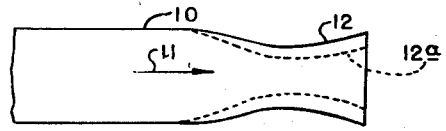
FIG.3.
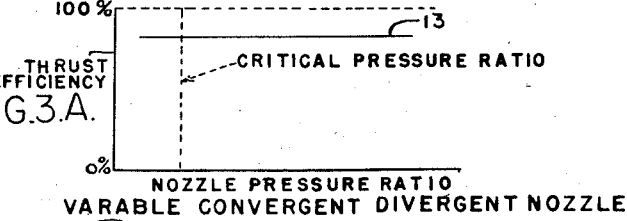
FIG.3.A.
NOZZLE PRESSURE RATIO
VARABLE CONVERGENT DIVERGENT NOZZLE
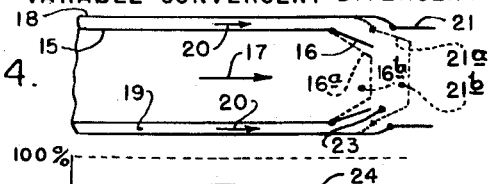
FIG.4.
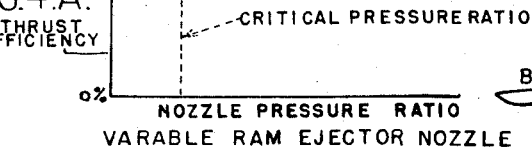
FIG.4.A.
NOZZLE PRESSURE RATIO
VARABLE RAM EJECTOR NOZZLE
INVENTOR
ROBERT G. GLENN
BY
AGENT

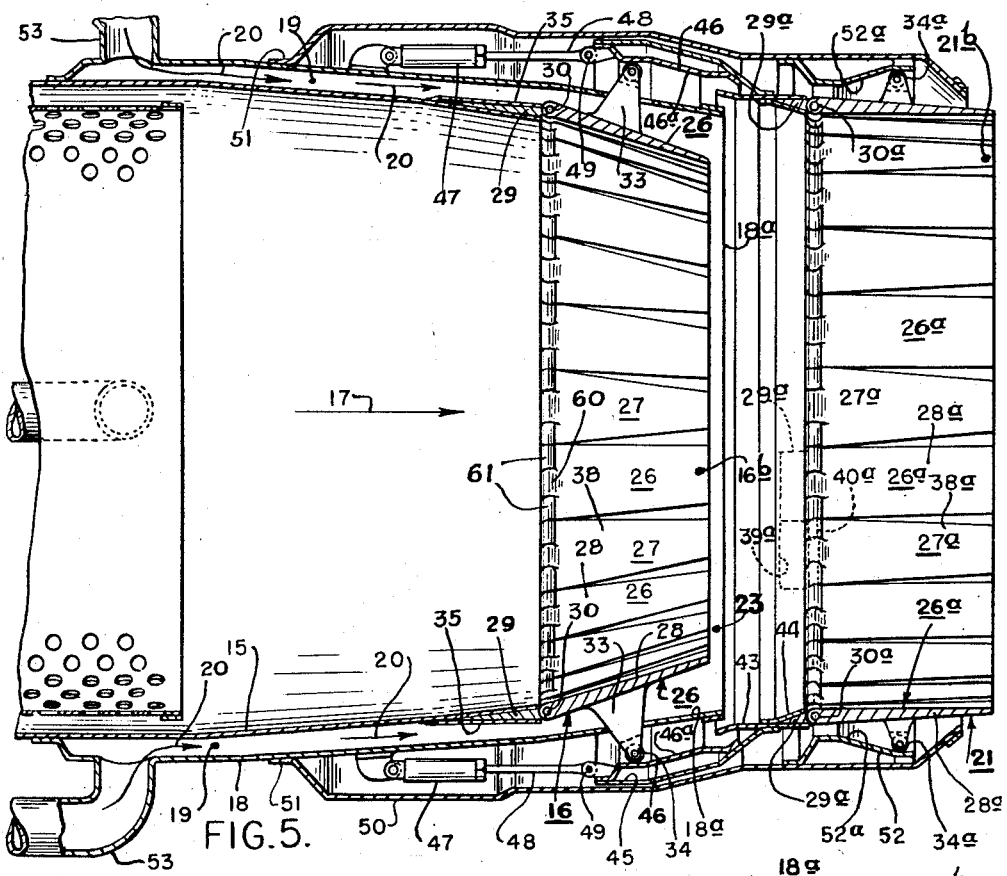
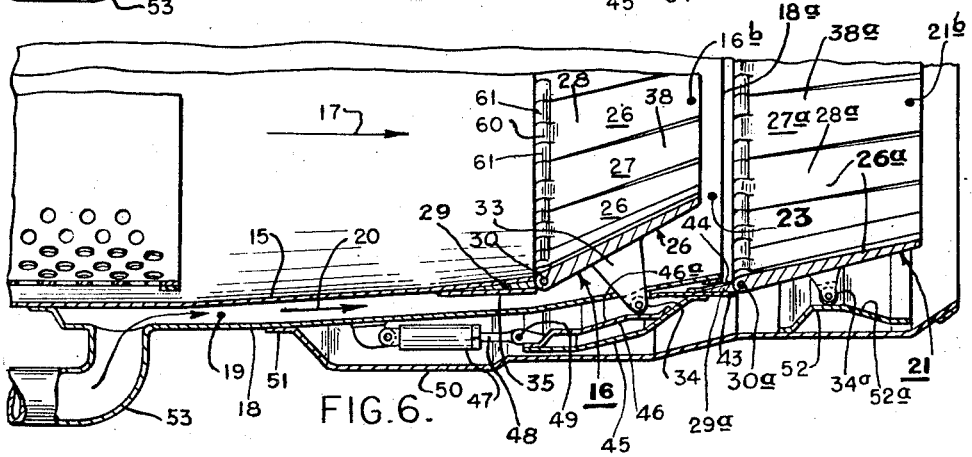

April 5, 1960 R. G. GLENN 2,931,169
VARIABLE CONVERGENT-DIVERGENT EXHAUST NOZZLE
Filed May 15, 1956 3 Sheets-Sheet 3

INVENTOR
ROBERT G. GLENN
BY
Frank Christiano Jr.
AGENT

United States Patent Office 2,931,169
Patented Apr. 5, 1960

2,931,169

VARIABLE CONVERGENT-DIVERGENT EXHAUST NOZZLE

Robert G. Glenn, Merriam, Kans., assignor to Westinghouse Electric Corporation, East Pittsburgh, Pa., a corporation of Pennsylvania Application May 15, 1956, Serial No. 584,945

1 Claim. (Cl. 60—35.6)

This invention relates to jet engines, more particularly to structure for varying the effective area of the exhaust outlets of jet engines, and has for a principal object to provide improved structure of the above type.

Another object of the invention is to provide variable area exhaust nozzle structure for a jet engine which is highly efficient in performance throughout its operating range, including control of exhaust gases at subsonic to supersonic velocities and/or subsonic to supersonic flight speeds of the engine.

A further object is to provide, in an exhaust nozzle structure including a primary variable nozzle and a secondary variable nozzle, simple yet dependable structure for actuating said primary and secondary nozzles in unison.

A more specific object is to provide an improved hinge structure which, when subjected to gas streams flowing at high velocities past both its faces, permits smooth flow of the gases with a minimum of turbulence.

In accordance with the invention, a jet engine such as a turbojet engine, for example, is provided with a primary variable area exhaust nozzle attached to the central tubular exhaust casing of the engine. An outer tubular ejector casing disposed in encompassing and radially spaced relation with the central exhaust casing and providing an annular air ejector duct, is attached to the engine and is provided with a secondary variable area exhaust nozzle disposed downstream of the primary variable nozzle. Both variable nozzles employ movable leaf segments including master and slave segments in mutually overlapping relation, the master leaf segments being movable in converging and diverging direction by annular cam structure. The primary nozzle cam structure is axially slidable, while the secondary nozzle cam structure is fixed to the ejector casing. However, the secondary nozzle structure is connected to the primary nozzle cam structure and is axially movable therewith as a unit. Hence, when the primary nozzle cam structure is moved axially in upstream direction (relative to gas flow) the leaves of the primary nozzle converge to reduce the area of the primary nozzle, and the secondary nozzle structure is moved toward the primary nozzle while its leaves are converged by the secondary nozzle cam structure. Conversely, when the primary nozzle cam structure is moved in downstream direction, the leaves of the primary and secondary nozzles move toward nozzle opening positions.

Ram air or compressed air bled from the compressor is directed through the ejector air duct between the central and outer casing and into the region between the primary and secondary nozzles to provide a "cushioning" effect which smooths the exhaust gas flow downstream of the primary nozzle and minimizes turbulence.

With the above arrangement, optimum flow path configuration is easily attainable, hence maximum thrust efficiency is attained throughout a wide operating range, including subsonic flow conditions with attendant low nozzle pressure ratio values, and supersonic flow conditions with attendant high nozzle pressure ratio values.

A specific feature of the invention resides in the smoothly contoured arrangement of the leaves of the primary variable area nozzle. These leaves are subjected to high temperature gases flowing at high velocity past their inner faces and relatively low temperature gases flowing at high velocity past their outer faces. However, the smoothly contoured leaves permit such flow with a minimum of loss due to turbulence and provide excellent transfer of heat from the highly heated central casing.

The above and other objects are effected by the invention as will be apparent from the following description and claim taken in connection with the accompanying drawings, forming a part of this application, in which:

Figs. 1 and 1A, 2 and 2A, 3 and 3A illustrate schematically prior art exhaust nozzles employed in jet engines and representative thrust efficiency curves attained therewith respectively;

Figs. 4 and 4A illustrate schematically a variable area exhaust nozzle arrangement for a jet engine in accordance with the invention and a representative thrust efficiency curve attained therewith, respectively;

Fig. 5 is an axial sectional view of a variable area exhaust nozzle structure for a jet engine embodying the invention, the nozzle structure being shown in one operative position;

Fig. 6 is a partial axial sectional view similar to Fig. 5, but showing the exhaust nozzle structure in another operative position;

Figure 7:
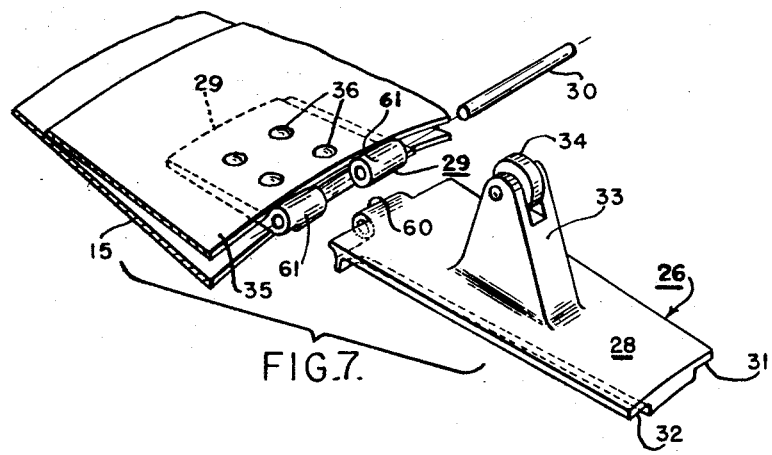
Fig. 7 is an exploded perspective view of one of the exhaust nozzle leaves and associated supporting structure.

Referring to the drawings in detail, Fig. 1 shows schematically a tubular exhaust casing 1 of a typical jet engine (not shown) through which the exhaust gases flow in the direction indicated by the arrow 3 and equipped with a conventional variably convergent exhaust nozzle 2. The nozzle 2 is movable from the position shown to the converged dotted line position 2a to reduce the cross-sectional area of the exhaust outlet 4 and thereby control the manner in which the exhaust gases are exhausted to the atmosphere in the form of a propulsive jet, for reasons well known in the art.

At elevated flight velocities of the aircraft, the pressure ratio at the exhaust nozzle 2 (fluid pressure at nozzle inlet/fluid pressure at nozzle outlet) may exceed the critical pressure ratio (pressure ratio at which the fluid through the nozzle attains sonic velocity). As shown by the representative chart in Fig. 1A, in which thrust efficiency in percentage (actual thrust × 100/isotropic thrust) is plotted against nozzle pressure ratio, the thrust efficiency decreases when the pressure ratio exceeds the critical value. The efficiency curve 5 shows that with the exhaust nozzle 2, the maximum thrust efficiency is attained at or below the critical pressure ratio and that departure therefrom into the range above the critical pressure ratio results in rapidly decreasing thrust efficiency.

Fig. 2 shows schematically a tubular exhaust casing 6 of a typical jet engine (not shown) through which the exhaust gases flow in the direction indicated by the arrow 7 and equipped with a conventional convergent-divergent exhaust nozzle 8 of the fixed cross-sectional area type. Nozzles of this type are utilized where it is desired to attain maximum thrust efficiency at nozzle pressure ratios above the critical value. As illustrated in the accompanying chart of Fig. 2A, wherein the efficiency curve 9 has been plotted for nozzle ratio values above critical, it will be noted that the curve 9 is considerably flatter than the efficiency curve 5 shown in Fig. 1A, indicating that the fixed convergent-divergent exhaust nozzle 8 has a higher average efficiency throughout its operating range than the variable converging exhaust nozzle 2 of Fig. 1. It will also be noted that with this arrangement, greater efficiency is obtained at pressure ratios above the critical value, and maximum efficiency is attained at the nozzle pressure ratio corresponding to the design point D.

In order to overcome the reduced efficiency of the fixed convergent-divergent exhaust nozzle 8 at nozzle pressure ratio values above or below the design point, convergent-divergent exhaust nozzles of the variable type have been proposed. As schematically illustrated in Fig. 3, a tubular exhaust casing 10 of a typical jet engine (not shown) through which the exhaust gases flow in the direction indicated by the arrow 11 is equipped with a conventional covergent-divergent exhaust nozzle 12 of the variable cross-sectional area type. Nozzles of this type may be provided with means (not shown) for varying the cross-sectional shape in small increments from that shown in solid lines to that shown by dotted lines 12a. As shown in the accompanying chart in Fig. 3A, the thrust efficiency of such a nozzle may be maintained at a maximum value throughout the operating range of the jet engine, as indicated by the straight line 13.

In view of the above, it is now obvious that the exhaust nozzle 12 is theoretically the ultimate or most desirable, from an efficiency standpoint, of all the nozzles heretofore described. However, it has not lent itself to a simple yet rugged design and in actual application is a complicated structure to design and fabricate. The resulting structure is also heavy and cumbersome, so that in actual practice the variable convergent-divergent nozzle has not borne out its expectations.

In accordance with the invention, as schematically illustrated in Fig. 4, a central tubular exhaust casing 15 of a typical jet engine (not shown) is provided with a variable area converging primary nozzle structure 16 for controlling the flow of engine exhaust gases, the direction of which is indicated by the arrow 17. An outer tubular casing 18, hereafter termed an ejector casing, encompassing the central casing and in radially spaced relation therewith is also provided. The two casings are concentric with each other and define an annular air ejector passageway 19 through which air at suitable pressure, sure as ram air from forwardly directed air inlets in the aircraft (not shown) or compressed air bled from the compressor (not shown) is delivered as indicated by the arrows 20.

The ejector casing 18 extends downstream of the primary nozzle structure 16 and is provided with secondary variable area nozzle structure 21 disposed in spaced co-axial alignment with the primary nozzle structure.

As will subsequently be described in detail, the primary nozzle structure 16 and the secondary nozzle structure 21 are jointly movable as desired from their solid line positions to their convergent dotted line positions 16a and 21a, respectively, to reduce the cross-sectional area of the primary exhaust outlet 16b and of the secondary exhaust outlet 21b. The movement of the exhaust nozzles 16 and 21 is preferably such that the ratio of the exhaust outlet area 16b to the exhaust outlet area 21b is constant throughout their range of travel.

The ejector air 20 communicates with the engine exhaust gases 17 in a region 23 disposed between the primary nozzle structure 16 and the secondary nozzle structure 21 and provides a cushion of pressurized air which prevents explosion or sudden expansion of the exhaust gases, thereby providing for smooth flow of the gases 17 exhausted by the primary nozzle structure 16 and insuring maximum thrust efficiency. In performance, the improved nozzle structure illustrated in Fig. 4 closely approaches the previously described variable convergent-divergent nozzle structure 12. Referring to Fig. 4A, it will be seen that the thrust efficiency curve 24 closely approaches the straight line efficiency characteristic 13 of the variable divergent-convergent nozzle 12 and is maintained at higher values of efficiency than the prior art nozzles 2 and 8 previously described through a considerable range extending from low nozzle pressure ratio to high nozzle pressure ratio.

Referring now to Figs. 5 and 6, there is illustrated, somewhat schematically, a more detailed embodiment of the invention in which the primary variable nozzle structure 16 carried by the central casing 15 comprises an annular array of movable leaves or segments, including master leaves 26 and slave leaves 27 alternately arranged and movable jointly to vary the cross-sectional area of the exhaust outlet 16b.

Figure 8:
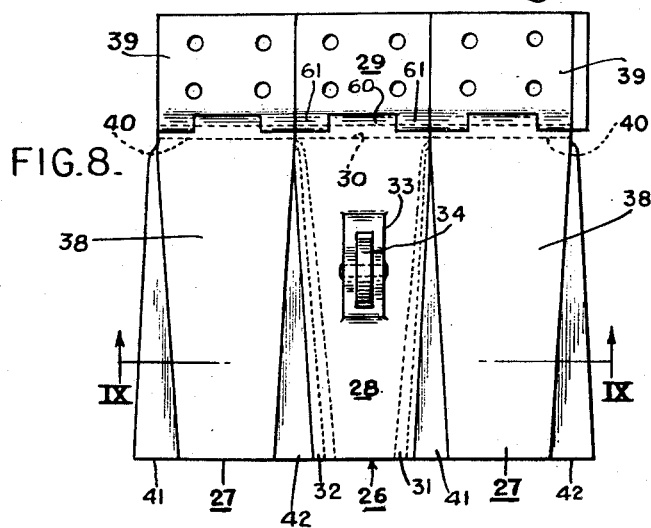
Fig. 8 is a plan showing several of the nozzle leaves in assembled relation.
Figure 9:
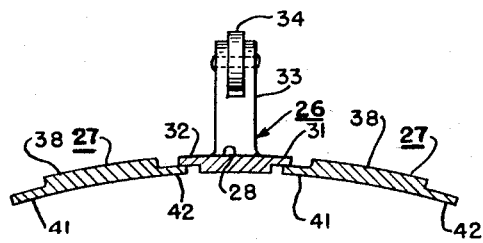
Fig. 9 is a sectional view taken on line IX—IX of Fig. 8.

Each of the master leaves 26, as best shown in Figs. 7 and 8, comprises a movable segment 28 and a stationary segment 29 hingeably connected together by a pintle 30. The movable segment is provided with laterally extending outer flanges 31 and 32 and a central upstanding portion 33 carrying a rotatably mounted cam follower 34. The stationary segment is interposed between the central casing 15 and a sheet metal annular band 35 and fixed therein by a plurality of rivets 36 or equivalent fastening means.

Each of the slave leaves 27 similarly comprises a movable segment 38 and a stationary segment 39 hingeably connected by a pintle 40. The movable segment 38 is provided with laterally extending inner flanges 41 and 42 which underlap the master leaf flanges 31 and 32 to permit joint movement thereof and to provide a gas seal throughout the range of movement of the leaves.

The secondary variable nozzle structure comprises an annular array of movable leaves, including master leaves 26a and slave leaves 27a alternately arranged and jointly movable to vary the cross-sectional area of the exhaust outlet 21b. The leaves 26a and 27a may be substantially similar to the primary nozzle leaves 26 and 27. Accordingly, each of the master leaves 26a comprises a movable segment 28a having a rotatably mounted cam follower 34a and a stationary segment 29a hingeably connected by a pintle 30a. Each of the slave leaves 27a comprises a movable segment 38a and a stationary segment 39a hingeably connected by a pintle 40a. The stationary segments 29a and 39a are carried by a sheet metal supporting ring 43 and are held between the supporting ring 43 and an inner retaining ring 44 by suitable fastening means (not shown).

The leaf supporting ring 43 extends upstream toward the ejector casing 18 and is disposed in spaced encompassing relation with the slightly faired downstream edge portion 18a of the ejector casing. The leaf supporting ring 43 is in turn fixedly received within a forwardly extending annular sheet metal member 45. The annular member 45 has fixedly nested therein a tubular cam member 46 disposed in encompassing relation with the movable primary nozzle 16 and acting to position the master leaf segments 28. Thus, it will be understood that the annular array of secondary exhaust nozzle leaves 26a and 27a are axially movable as a unit with the tubular cam member 46.

A plurality of power actuators 47 attached to the outer surface of the ejector casing 18 and having reciprocable rods 48 pivotally attached at 49 to the tubular cam member 46 are employed to axially translate the secondary nozzle 21 and the cam member 46.

The annular member 45 is slidably received within a stationary elongated tubular shell structure 50 which encompasses the ejector casing 18 and is fixed thereto by an annular flange 51. The stationary shell structure 50 extends downstream beyond the primary nozzle and encircles the secondary nozzle 21. The stationary shell structure 50, at its downstream end, has fixedly nested therein a stationary tubular cam structure 52 acting to position the secondary nozzle master leaf segments 28a.

Conduits 53 for delivering pressurized air to the ejector air passageway 19 are also provided. As previously stated, the air supplied by the conduits 53 may be ram air collected by forwardly directed air inlets (not shown) provided in the aircraft or it may be pressurized air bled from the engine compressor (not shown).

In operation, when the turbojet engine (not shown) is operating at low thrust values (i.e., reduced power output), the velocity of the hot exhaust gases 17 is subsonic and the nozzle pressure ratio is below the critical value. During such conditions, as shown in Fig. 6, the primary exhaust nozzle 16 and the secondary exhaust nozzle 21 are in their extreme convergent positions, thereby reducing the cross-sectional area of the exhaust outlets 16b and 21b, respectively. Ejector air 20 from the ejector passageway 19 flows into the region 23 intermediate the nozzles and prevents breaking away or explosion of the exhaust gases ejected through the primary nozzle 16 and causes the hot gases to flow through the region 23 and into the secondary nozzle 21 smoothly and with substantially no turbulence. The ejector air and hot exhaust gases are then directed through the secondary exhaust nozzle 21 to the atmosphere in the form of a propulsive jet. Since the combined volume of the hot gases and ejector air is greater than that of the hot gases alone, the secondary nozzle is of somewhat larger diameter than the primary nozzle and its annular array of movable master and slave leaf segments 28a and 38a, respectively, are disposed at a smaller angle of convergence than the array of master and slave leaf segments 28 and 38, respectively, of the primary nozzle. With this arrangement, the cross-sectional area of the primary exhaust outlet 16b is less than the cross-sectional area of the secondary exhaust outlet 21b.

When the turbojet engine is operating at increased thrust values, the velocity of the hot gases is accordingly greater and assumes sonic to supersonic velocities with attendant greater nozzle pressure ratio values depending upon the engine operating conditions and/or flight speed of the aircraft. At maximum supersonic velocity of the hot gases 17, the primary nozzle structure 16 and secondary nozzle structure 21 are in the positions shown in Fig. 5. These positions are the maximum open nozzle positions. That is, the cross-sectional areas of the primary exhaust outlet 16b and secondary exhaust outlet 21b are at maximum value to properly accommodate the increased velocity and/or volume of the gases flowing therethrough.

The nozzles are moved to the positions shown in Fig. 5 in the following manner by the power actuators 47 in response to suitable engine parameters, as is well known in the art. The actuating rods 48 are extended, thereby moving in downstream direction the unitary structure comprising the annular member 45, the primary cam member 46, the secondary nozzle leaf supporting ring 43 and the secondary nozzle leaf array. During this movement, the primary cam member 46 is moved relative to the cam followers 34 of the primary master leaves 26. The cam member 46 has a cam surface 46a formed in such a manner that movement in downstream direction causes the master leaf segments 28 to be urged radially outwardly to a more open position by the pressure of the exhaust gases 17 and permitting a following movement of the slave leaf segments 38. Concurrently therewith, downstream movement of the cam followers 34a on the movable master leaf segments of the secondary nozzle relative to the cam surface 52a of the fixed cam member 52 permits radially outward movement of the movable master leaf segments 28a and following movement of the movable slave leaf segments 38a by the outward pressure of the gases flowing through the secondary nozzle. To restrict the area of the exhaust outlets 16b and 21b, the power actuator rods 48 are retracted and the above operations are reversed.

The power actuators 47 are preferably of the modulating type movable in small increments in both retracting and extending directions, so that the primary and secondary nozzle structure 16 and 21 may be adjusted to a plurality of positions between the maximum and minimum opening limits shown in Figs. 5 and 6, respectively.

Also, the primary cam surface 46a and the secondary cam surface 52a are preferably so formed that the ratio of the primary exhaust outlet area to the secondary exhaust outlet area is constant throughout the entire operating range.

Since the movable segments 28 and 38 of the primary master and slave leaves 26 and 27, respectively, are exposed to hot gas flow along their inner concave surfaces and to cool ejector air flow along their outer convex surfaces, and since it is particularly advantageous to permit such flow to occur with minimum aerodynamic flow loss, the leaves are smoothly contoured, as best illustrated in Fig. 7, wherein a master leaf 26 is illustrated. It will also be seen by reference thereto that the movable segment 28 is provided with a pintle-receiving portion 60 which is of the same cross-sectional dimension as the movable segment, while the stationary segment 29 is provided with a pair of spaced pintle-receiving portions 61 of similar cross-sectional dimensions, so that upon assembly they define an outer smooth air flow surface with the annular band 35 and the outer convex surface of the movable segment. They similarly define an inner smooth hot gas flow surface with the central casing 15 and the inner concave surface of the movable segment.

With the above leaf arrangement, heat exchange is efficiently effected between the highly heated primary nozzle leaves and central casing and the cool ejector air.

It will now be seen that the invention provides a simple yet durable exhaust nozzle arrangement for a jet engine which is highly efficient throughout an operating range including control of exhaust gases flowing at subsonic and supersonic velocities.

While the invention has been shown in but one form, it will be obvious to those skilled in the art that it is not so limited, but is susceptible of various changes and modifications without departing from the spirit thereof.

What is claimed is:

A structure for controlling the effective area of an exhaust outlet of a jet engine comprising a tubular central exhaust gas casing, a tubular outer casing supported in encompassing spaced relation with said central casing and together therewith defining an annular ejector passageway, means for delivering air to said passageway, a primary variable area nozzle including a first annular array of leaves hingeably attached to the downstream end of said central casing, an annular shell member disposed downstream of said central casing and in concentric relation therewith, a secondary variable area nozzle including a second annular array of leaves hingeably attached to the downstream end of said annular shell member, and means for jointly moving said first array of leaves and said second array of leaves in the same direction, said last mentioned means including first and second annular cam members, said second cam member being fixed to said outer casing, said first cam member being fixed to said annular shell member, and said annular shell member being movable in axial direction whereby to provide relative axial movement between said cam members and said leaves.

References Cited in the file of this patent

UNITED STATES PATENTS

| | | |
|---|---|---|
| 2,682,147 | Ferris | June 29, 1954 |
| 2,806,349 | Yeager | Sept. 17, 1957 |
| 2,846,844 | O'Rourke | Aug. 12, 1958 |

FOREIGN PATENTS

| | | |
|---|---|---|
| 1,018,650 | France | Oct. 15, 1952 |
| 1,107,564 | France | Aug. 10, 1955 |
| 711,941 | Great Britain | July 14, 1954 |